United States Patent
Zhang et al.

(10) Patent No.: US 10,485,015 B2
(45) Date of Patent: Nov. 19, 2019

(54) METHOD AND APPARATUS FOR PROCESSING ADAPTIVE FLOW TABLE

(71) Applicant: Huawei Technologies Co., Ltd., Shenzhen, Guangdong (CN)

(72) Inventors: Wei Zhang, Shanghai (CN); Chenghui Peng, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 154 days.

(21) Appl. No.: 15/617,471

(22) Filed: Jun. 8, 2017

(65) Prior Publication Data
US 2017/0273099 A1 Sep. 21, 2017

Related U.S. Application Data

(63) Continuation of application No. PCT/CN2014/093368, filed on Dec. 9, 2014.

(51) Int. Cl.
- H04W 72/12 (2009.01)
- H04W 72/14 (2009.01)
- H04L 12/715 (2013.01)
- H04L 12/851 (2013.01)

(52) U.S. Cl.
CPC ......... *H04W 72/1257* (2013.01); *H04L 45/64* (2013.01); *H04W 72/1268* (2013.01); *H04W 72/14* (2013.01); *H04L 47/2441* (2013.01)

(58) Field of Classification Search
CPC ......... H04W 72/1257; H04W 72/1268; H04W 72/14; H04W 72/12; H04L 45/64; H04L 47/2441
See application file for complete search history.

(56) References Cited

U.S. PATENT DOCUMENTS

| | | |
|---|---|---|
| 2009/0238188 A1 | 9/2009 | Xu et al. |
| 2013/0054761 A1 | 2/2013 | Kempf et al. |
| 2013/0208592 A1* | 8/2013 | Lu .................. H04L 47/10 370/231 |
| 2013/0279371 A1 | 10/2013 | Takashima et al. |

(Continued)

FOREIGN PATENT DOCUMENTS

| | | |
|---|---|---|
| CN | 1708029 A | 12/2005 |
| CN | 101202652 A | 6/2008 |

(Continued)

OTHER PUBLICATIONS

Riggio et al., "Programming Software-Defined Wireless Networks", 2014 10th International Conference on Network and Service Management (CNSM), Nov. 2014, pp. 118-126.

(Continued)

*Primary Examiner* — Kyaw Z Soe
(74) *Attorney, Agent, or Firm* — Leydig, Voit & Mayer, Ltd.

(57) ABSTRACT

A method and an apparatus for processing an adaptive flow table are disclosed. When resource scheduling is performed, a terminal device or a data stream that performs uplink data transmission in a scheduled time period is determined; a corresponding flow rule of the terminal device or the data stream is queried, and the found flow rule is updated to a flow table; and when a data packet is received, corresponding processing is performed on the data packet according to a flow rule in the flow table.

18 Claims, 7 Drawing Sheets

(56) References Cited

U.S. PATENT DOCUMENTS

| | | | |
|---|---|---|---|
| 2013/0304915 A1 | 11/2013 | Kawai | |
| 2014/0341131 A1 | 11/2014 | Jeon et al. | |
| 2015/0180769 A1* | 6/2015 | Wang | H04L 45/38 |
| | | | 370/236 |
| 2015/0280927 A1 | 10/2015 | Liang et al. | |
| 2015/0381480 A1 | 12/2015 | OHara | |
| 2016/0065501 A1 | 3/2016 | Watanabe | |
| 2016/0359642 A1 | 12/2016 | Song et al. | |

FOREIGN PATENT DOCUMENTS

| | | |
|---|---|---|
| CN | 101340356 A | 1/2009 |
| CN | 102394675 A | 3/2012 |
| CN | 102984069 A | 3/2013 |
| CN | 103152264 A | 6/2013 |
| CN | 103329488 A | 9/2013 |
| CN | 103346969 A | 10/2013 |
| CN | 103401797 A | 11/2013 |
| CN | 103581020 A | 2/2014 |
| CN | 103731901 A | 4/2014 |
| CN | 103812778 A | 5/2014 |
| JP | 2016048854 A | 4/2016 |
| WO | 2014132298 A1 | 9/2014 |

OTHER PUBLICATIONS

"OpenFlow Table Type Patterns, Version No. 1.0", Open Networking Foundation, Aug. 15, 2014, 55 pages.
Xiang Mi et al, "NO stack: A SDN-based Framework for Future Cellular Networks", Sep. 1, 2014, pp. 497-502, XP55577020.

* cited by examiner

METHOD AND APPARATUS FOR PROCESSING ADAPTIVE FLOW TABLE

CROSS-REFERENCE TO RELATED APPLICATIONS

This application is a continuation of International Application No. PCT/CN2014/093368, filed on Dec. 9, 2014, the disclosure of which is hereby incorporated by reference in its entirety.

TECHNICAL FIELD

This application relates to the field of wireless communications technologies, and more specifically, to a method and an apparatus for processing an adaptive flow table.

BACKGROUND

Software Defined Network (Software Defined Network, SDN) is a new network architecture. By separating a control layer of a network device from a forwarding layer of the network device, the Software Defined Network implements flexible network traffic control, enhances network management efficiency, and provides a good platform for core network innovation and application innovation.

OpenFlow is one of typical technologies for implementing the Software Defined Network. Network element devices in Software Defined Network based on the OpenFlow technology mainly include an OpenFlow controller (OpenFlow Controller) and an OpenFlow switch (OpenFlow Switch). The OpenFlow switch is a core component, and includes three parts: an OpenFlow protocol, a secure channel, and a flow table. The OpenFlow switch may include one or more flow tables. The flow table includes many flow table entries, and each flow table entry is a flow rule. The flow rule is generated by the controller and delivered to the switch. When receiving data, the switch performs flow table matching on the received data by performing querying in the flow table, and executes a corresponding operation on the data according to a matched flow rule.

In a future communications network, there are increasingly more types of data services. Accordingly, most efficient processing processes required by various data services are different from each other. A data processing device in the future network needs to identify different data streams so as to execute different processing processes. In a wireless communications network, data processing flexibility of a base station may be extended with the help of flexibility of OpenFlow. During data processing, a flow table-based data processing technology is introduced, to perform matching between a received data packet and a rule in the flow table, and further to address an appropriate processing process.

According to a current flow table rule matching capability, when there are 6000 to 7000 data streams, time consumed in flow table rule matching reaches a millisecond level and may reach five milliseconds.

In a scenario of the future network involving massive data connections, for example, millions of data connections may exist in one base station at the same time. In the base station, the millions of data connections correspond to data stream matching rules of a same quantity. If a large quantity of flow rules are stored in a flow table and wait for data packets to perform rule matching, a delay is caused, and a requirement imposed on a data processing delay by a wireless communications system cannot be met.

SUMMARY

This application provides a method for processing an adaptive flow table, so as to reduce a delay of data processing in a flow table matching process.

To achieve the foregoing objective, this application provides the following technical solutions:

According to a first aspect, a method for processing an adaptive flow table is provided, including:

performing, by a wireless access device, resource scheduling to determine a terminal device or a data stream that performs uplink data transmission in a scheduled time period;

querying, by the wireless access device, a corresponding flow rule of the terminal device or the data stream, and updating the found flow rule to a flow table; and when receiving a data packet in the scheduled time period, querying, by the wireless access device and from the flow table, a flow rule corresponding to the data packet, and performing corresponding processing on the data packet according to the flow rule corresponding to the data packet.

With reference to the first aspect, in a specific implementation manner, the querying, by the wireless access device, a corresponding flow rule of the terminal device or the data stream that performs data transmission in the scheduled time period includes:

querying, by the wireless access device and from a rule pool, the corresponding flow rule of the terminal device or the data stream according to a terminal device identifier of the terminal device or a connection identifier of the data stream.

With reference to the first aspect, in a specific implementation manner, the querying, by the wireless access device and from the flow table, a flow rule corresponding to the data packet includes:

querying, by the wireless access device, from the flow table, and according to a terminal device identifier or a connection identifier of the data packet, the flow rule corresponding to the data packet.

With reference to the foregoing aspect or implementation manner, the method further includes: deleting the corresponding flow rule in the flow table after data processing is completed; or deleting the corresponding flow rule in the flow table after several scheduling cycles.

According to another aspect, a method for processing an adaptive flow table is provided, including:

receiving, by a wireless access device, a flow rule sent by a wireless access device controller, where the flow rule is a corresponding flow rule that is found after the wireless access device controller performs resource scheduling to determine a terminal device or a data stream that performs uplink data transmission in a scheduled time period, and that is of the terminal device or the data stream;

updating, by the wireless access device, the flow rule to a flow table; and when receiving a data packet in the scheduled time period, querying, by the wireless access device and from the flow table, a flow rule corresponding to the data packet, and performing corresponding processing on the data packet according to the flow rule corresponding to the data packet.

With reference to the foregoing aspect, in a specific implementation manner, the wireless access device receives, by using a flow rule control message, the flow rule sent by the wireless access device controller.

With reference to the foregoing aspect, in a specific implementation manner, the querying, by the wireless access device and from the flow table, a flow rule corresponding to the data packet includes:

querying, by the wireless access device, from the flow table, and according to a terminal device identifier or a connection identifier of the data packet, the flow rule corresponding to the data packet.

With reference to the foregoing aspect or implementation manner, the method further includes:

deleting the corresponding flow rule in the flow table after data processing is completed;

deleting the corresponding flow rule in the flow table after several scheduling cycles; or deleting the corresponding flow rule in the flow table according to a deletion instruction delivered by the wireless access device controller.

According to still another aspect, a method for processing an adaptive flow table is provided, including:

receiving, by a wireless access device, an identifier that is of a terminal device or a data stream and that is sent by a wireless access device controller, where the identifier of the terminal device or the data stream is an identifier of a terminal device or a data stream that performs uplink data transmission in a scheduled time period and that is determined by the wireless access device controller by performing resource scheduling;

querying, by the wireless access device, a corresponding flow rule of the terminal device or the data stream according to the identifier of the terminal device or the data stream, and updating the found flow rule to a flow table; and when receiving a data packet in the scheduled time period, querying, by the wireless access device and from the flow table, a flow rule corresponding to the data packet, and performing corresponding processing on the data packet according to the flow rule corresponding to the data packet.

With reference to the foregoing aspect, in a specific implementation manner, the wireless access device receives, by using a scheduling grant message, the identifier that is of the terminal device or the data stream and that is sent by the wireless access device controller.

With reference to the foregoing aspect, in a specific implementation manner, the querying, by the wireless access device, a corresponding flow rule of the terminal device or the data stream according to the identifier of the terminal device or the data stream includes:

querying, by the wireless access device and from a rule pool, the corresponding flow rule of the terminal device or the data stream according to a terminal device identifier of the terminal device or a connection identifier of the data stream.

With reference to the foregoing aspect, in a specific implementation manner, the querying, by the wireless access device and from the flow table, a flow rule corresponding to the data packet includes:

querying, by the wireless access device, from the flow table, and according to a terminal device identifier or a connection identifier of the data packet, the flow rule corresponding to the data packet.

With reference to the foregoing aspect or implementation manner, the method further includes:

deleting the corresponding flow rule in the flow table after data processing is completed;

deleting the corresponding flow rule in the flow table after several scheduling cycles; or deleting the corresponding flow rule in the flow table according to a deletion instruction delivered by the wireless access device controller.

According to yet another aspect, a method for processing an adaptive flow table is provided, including:

after performing resource scheduling to determine a terminal device or a data stream that performs uplink data transmission in a scheduled time period, querying, by a wireless access device controller, a corresponding flow rule of the terminal device or the data stream; and sending, by the wireless access device controller, the found flow rule to a wireless access device, so that the wireless access device updates the flow rule to a flow table, and when receiving a data packet in the scheduled time period, the wireless access device queries, from the flow table, a flow rule corresponding to the data packet, and performs corresponding processing on the data packet according to the flow rule corresponding to the data packet.

With reference to the foregoing aspect, in a specific implementation manner, the wireless access device controller sends, by using a flow rule control message, the found flow rule to the wireless access device.

According to still yet another aspect, an apparatus for processing an adaptive flow table is provided, including:

a scheduling module, configured to perform resource scheduling to determine a terminal device or a data stream that performs uplink data transmission in a scheduled time period;

a query module, configured to query a corresponding flow rule of the terminal device or the data stream, and update the found flow rule to a flow table; and when a processing module receives a data packet in the scheduled time period, query, from the flow table, a flow rule corresponding to the data packet; and the processing module, configured to receive the data packet in the scheduled time period, and perform corresponding processing on the data packet according to the flow rule corresponding to the data packet.

With reference to the foregoing aspect, in a specific implementation manner, the query module is specifically configured to:

query, from a rule pool, the corresponding flow rule of the terminal device or the data stream according to a terminal device identifier of the terminal device or a connection identifier of the data stream.

With reference to the foregoing aspect, in a specific implementation manner, the query module is specifically configured to:

query, from the flow table according to a terminal device identifier or a connection identifier of the data packet, the flow rule corresponding to the data packet.

With reference to the foregoing aspect or implementation manner, the apparatus further includes:

a deletion module, configured to delete the corresponding flow rule in the flow table after data processing is completed; or delete the corresponding flow rule in the flow table after several scheduling cycles.

According to a further aspect, an apparatus for processing an adaptive flow table is provided, including:

a receiving module, configured to receive a flow rule sent by a wireless access device controller, where the flow rule is a corresponding flow rule that is found after the wireless access device controller performs resource scheduling to determine a terminal device or a data stream that performs uplink data transmission in a scheduled time period, and that is of the terminal device or the data stream;

a query module, configured to update the flow rule to a flow table; and when a processing module receives a data packet in the scheduled time period, query, from the flow table, a flow rule corresponding to the data packet; and the processing module, configured to receive the data packet in the scheduled time period, and perform corresponding processing on the data packet according to the flow rule corresponding to the data packet.

With reference to the foregoing aspect, in a specific implementation manner, the receiving module is specifically configured to receive, by using a flow rule control message, the flow rule sent by the wireless access device controller.

With reference to the foregoing aspect or implementation manner, the apparatus further includes:

a deletion module, configured to delete the corresponding flow rule in the flow table after data processing is completed; or delete the corresponding flow rule in the flow table after several scheduling cycles; or delete the corresponding flow rule in the flow table according to a deletion instruction sent by the wireless access device controller.

According to a still further aspect, an apparatus for processing an adaptive flow table is provided, including:

a receiving module, configured to receive an identifier that is of a terminal device or a data stream and that is sent by a wireless access device controller, where the identifier of the terminal device or the data stream is an identifier of a terminal device or a data stream that performs uplink data transmission in a scheduled time period and that is determined by the wireless access device controller by performing resource scheduling;

a query module, configured to query a corresponding flow rule of the terminal device or the data stream according to the identifier of the terminal device or the data stream, and update the found flow rule to a flow table; and when a processing module receives a data packet in the scheduled time period, query, from the flow table, a flow rule corresponding to the data packet; and the processing module, configured to receive the data packet in the scheduled time period, and perform corresponding processing on the data packet according to the flow rule corresponding to the data packet.

With reference to the foregoing aspect, in a specific implementation manner, the receiving module is specifically configured to receive, by using a scheduling grant message, the identifier that is of the terminal device or the data stream and that is sent by the wireless access device controller.

According to a yet further aspect, an apparatus for processing an adaptive flow table is provided, including:

a scheduling module, configured to perform resource scheduling to determine a terminal device or a data stream that performs uplink data transmission in a scheduled time period;

a query module, configured to query a corresponding flow rule of the terminal device or the data stream; and a sending module, configured to send the found flow rule to a wireless access device, so that the wireless access device updates the flow rule to a flow table, and when receiving a data packet in the scheduled time period, the wireless access device queries, from the flow table, a flow rule corresponding to the data packet, and performs corresponding processing on the data packet according to the flow rule corresponding to the data packet.

In conclusion, according to the method and the apparatus for processing an adaptive flow table provided in this application, when resource scheduling is performed, a terminal device or a data stream that performs uplink data transmission in a scheduled time period is determined; a corresponding flow rule of the terminal device or the data stream is queried, and the found flow rule is updated to a flow table; and when a data packet is received, corresponding processing is performed on the data packet according to a flow rule in the flow table. This reduces a delay of data processing in a flow table matching process.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely the embodiments of the present invention, and a person of ordinary skill in the art may still derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Because an existing flow table mechanism is designed based on the Internet, and in the Internet, time at which a data packet arrives is uncontrollable, a flow table can only be pre-stored in a switch, and the switch passively waits for arrival of the data packet. After the data packet arrives, flow rule matching is performed.

Figure 1A:
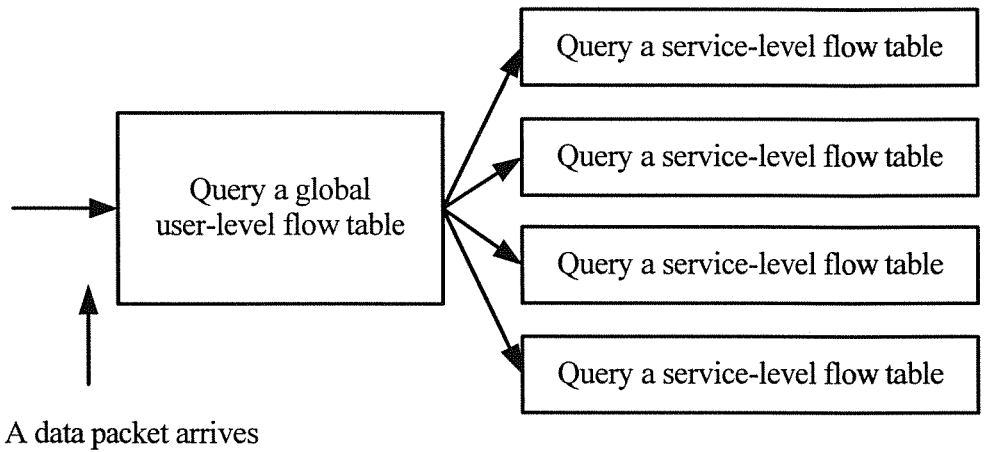
FIG. 1A is a schematic flowchart of a method for processing an adaptive flow table in the prior art.

In an existing method for processing a flow table in a wireless communications network, all terminal device connection information that needs to be matched is completely stored in a flow table. For example, as shown in FIG. 1A, when a data packet arrives at a base station, starting from this time point, a flow table of a global terminal device level is queried; after a terminal device to which the data packet belongs is identified, a service-level flow table corresponding to the terminal device is queried, so as to identify a service flow to which the data packet belongs. However, in a future wireless communications network, an extremely large quantity of terminal device connections supported by a base station results in a huge quantity of flow rules in a flow table. Consequently, a delay caused in a flow rule matching process cannot meet a requirement imposed on a delay in wireless communication.

In a wireless communications network, because uplink data transmission is precisely controlled, before a data packet arrives, a device in the network, such as a base station or a base station controller, may learn information about a data packet to be transmitted in a next time period, such as information about a terminal device to which the data packet belongs. The present invention proposes a technical solution of an adaptive flow table, in which an air interface resource scheduling process is combined with adjustment of a flow table, and a flow rule in the flow table is quickly updated and adjusted based on a result of uplink resource scheduling.

In a specific embodiment, a method for processing an adaptive flow table in the present invention includes:

performing, by a wireless access device, resource scheduling to determine a terminal device or a data stream that performs uplink data transmission in a scheduled time period;

querying, by the wireless access device, a corresponding flow rule of the terminal device or the data stream, and updating the found flow rule to a flow table; and when receiving a data packet in the scheduled time period, querying, by the wireless access device and from the flow table, a flow rule corresponding to the data packet, and performing corresponding processing on the data packet according to the flow rule corresponding to the data packet.

In another specific embodiment, a method for processing an adaptive flow table in the present invention includes:

receiving, by a wireless access device, a flow rule sent by a wireless access device controller, where the flow rule is a corresponding flow rule that is found after the wireless access device controller performs resource scheduling to determine a terminal device or a data stream that performs uplink data transmission in a scheduled time period, and that is of the terminal device or the data stream;

updating, by the wireless access device, the flow rule to a flow table; and when receiving a data packet in the scheduled time period, querying, by the wireless access device and from the flow table, a flow rule corresponding to the data packet, and performing corresponding processing on the data packet according to the flow rule corresponding to the data packet.

In still another specific embodiment, a method for processing an adaptive flow table in the present invention includes:

receiving, by a wireless access device, an identifier that is of a terminal device or a data stream and that is sent by a wireless access device controller, where the identifier of the terminal device or the data stream is an identifier of a terminal device or a data stream that performs uplink data transmission in a scheduled time period and that is determined by the wireless access device controller by performing resource scheduling;

querying, by the wireless access device, a corresponding flow rule of the terminal device or the data stream according to the identifier of the terminal device or the data stream, and updating the found flow rule to a flow table; and when receiving a data packet in the scheduled time period, querying, by the wireless access device and from the flow table, a flow rule corresponding to the data packet, and performing corresponding processing on the data packet according to the flow rule corresponding to the data packet.

In yet another specific embodiment, a method for processing an adaptive flow table in the present invention includes:

after performing resource scheduling to determine a terminal device or a data stream that performs uplink data transmission in a scheduled time period, querying, by a wireless access device controller, a corresponding flow rule of the terminal device or the data stream; and sending, by the wireless access device controller, the found flow rule to a wireless access device, so that the wireless access device updates the flow rule to a flow table, and when receiving a data packet in the scheduled time period, the wireless access device queries, from the flow table, a flow rule corresponding to the data packet, and performs corresponding processing on the data packet according to the flow rule corresponding to the data packet.

Figure 1B:
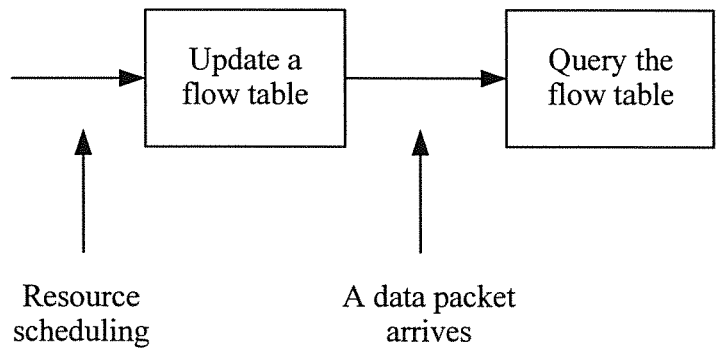
FIG. 1B is a schematic flowchart of a method for processing an adaptive flow table according to this application.

A system for processing an adaptive flow rule in an embodiment of the present invention includes three functional units: a flow table, a rule pool, and a scheduler. Different from the prior art, all flow rules are placed in a rule pool rather than in a flow table. As shown in FIG. 1B, after the scheduler completes resource scheduling once, a terminal device or a data stream that performs data transmission in a scheduled transmission time period is determined according to a scheduling result of the scheduler; a flow rule corresponding to the terminal device or the data stream is found from the rule pool and updated to the flow table, so as to form a small-scale flow table. Then, when a data packet is received, a corresponding flow rule is matched by performing querying only according to a flow rule in the formed flow table. Further, corresponding processing is performed on the data packet. A scale of the flow table is relatively small, so that a delay of data in a flow table matching process is reduced. After the scheduler completes scheduling each time, the flow table may be continuously updated based on the rule pool and a scheduling result of the scheduler. After data processing is completed, a flow rule updated last time is deleted so as to ensure that the flow table is not excessively large.

A wireless communications system mainly includes a wireless access device and a wireless access device controller, such as a base station BS (Base Station) and a base station controller BSC (Base Station Controller), or a NodeB and a radio network controller RNC (Radio Network Controller). In a specific embodiment, all the three functional units, that is, the flow table, the rule pool, and the scheduler, may be integrated in the wireless access device, for example, integrated in a base station or a NodeB to be used as three functional units of the base station or the NodeB.

Figure 1C:
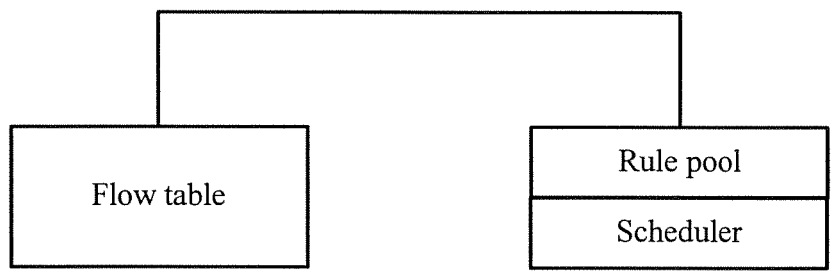
FIG. 1C is a schematic diagram of a system for processing an adaptive flow table according to an embodiment of this application.
Figure 1D:
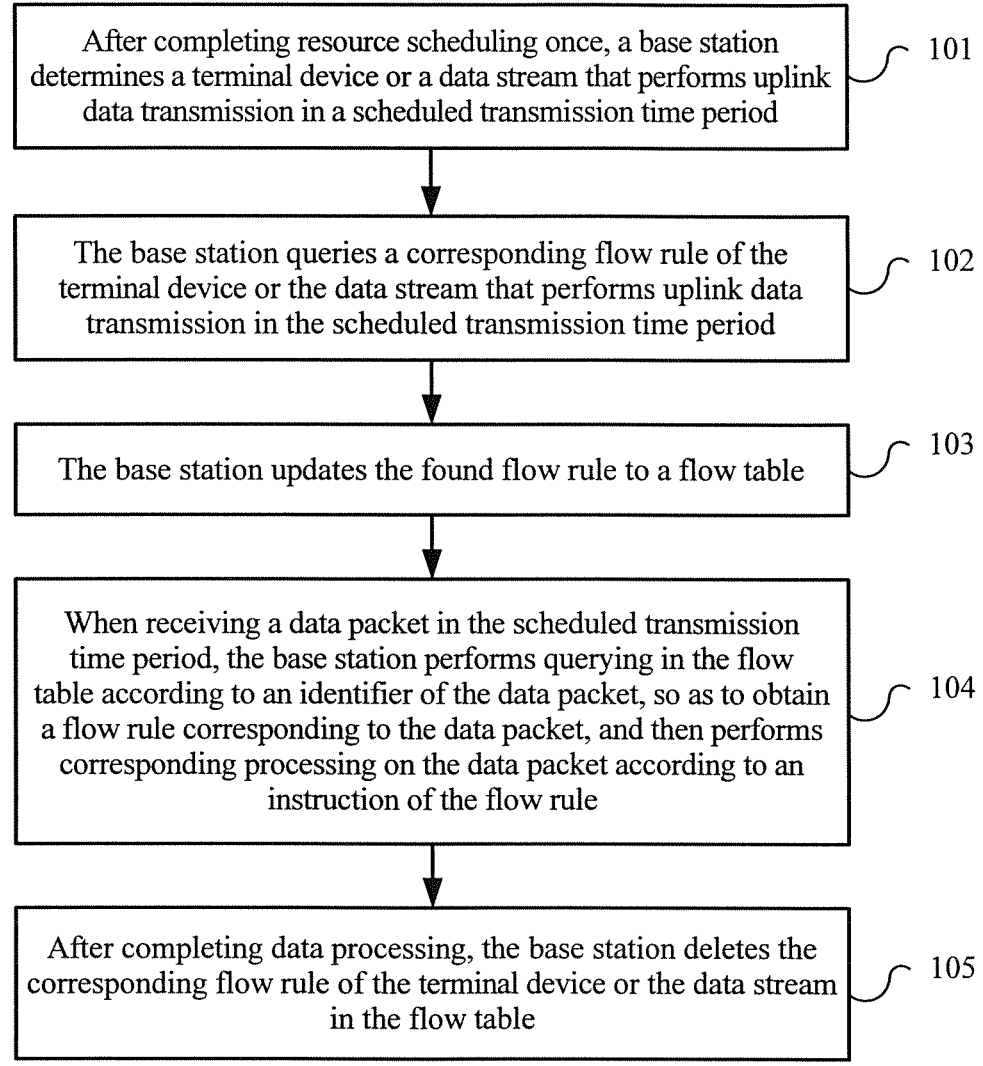
FIG. 1D is a flowchart of a method for processing an adaptive flow table according to an embodiment of this application.

FIG. 1C is a schematic diagram of a system for processing an adaptive flow table according to an embodiment of this application. In this embodiment, that three functional units, that is, a flow table, a rule pool, and a scheduler, are integrated in a base station is used as an example for description. Referring to FIG. 1D, a method for processing the adaptive flow table may include the following steps.

Step 101: After completing resource scheduling once, a base station determines a terminal device or a data stream that performs uplink data transmission in a scheduled time period.

After a scheduler of the base station completes resource scheduling once, a terminal device or a data stream that transmits data to the base station in a scheduled transmission time period may be determined. There may be one or more terminal devices or data streams. The base station may learn an identifier of the terminal device or the data stream, such as a terminal device identifier of the terminal device or a connection identifier of the data stream.

Step 102: The base station queries a corresponding flow rule of the terminal device or the data stream that performs uplink data transmission in the scheduled time period.

After determining the terminal device or the data stream that transmits data to the base station in the scheduled transmission time period, the base station queries, from the rule pool, a corresponding flow rule of the terminal device or the data stream according to the identifier of the terminal device or the data stream. For example, the base station may perform querying in the rule pool according to the terminal device identifier of the terminal device or the connection identifier of the data stream, to obtain a corresponding flow rule that is of the terminal device or the data stream and that may be used in the scheduled transmission time period. For a manner of table lookup, refer to the embodiment shown in FIG. 1A.

Step 103: The base station updates the found flow rule to a flow table.

In this step, the base station may write the found flow rule into the flow table before the scheduled transmission time period. The found flow rule may include the identifier of the terminal device or the data stream and the corresponding flow rule. Further, a flow rule existed in the flow table may be deleted so as to avoid excessively long table lookup time caused by an excessively large flow table after a data packet is received.

The flow table may be in multiple forms. For example, a first-level flow table may be used, and the corresponding flow rule may be directly found according to the identifier of the terminal device or the data stream; or a second-level flow table described in the embodiment shown in FIG. 1A may be used.

Step 104: When receiving a data packet in the scheduled time period, the base station performs querying in the flow table according to an identifier of the data packet, for example, performs querying according to a terminal device identifier or a connection identifier of the data packet, to obtain a flow rule corresponding to the data packet, and then performs corresponding processing on the data packet according to an instruction of the flow rule.

If a second-level flow table is formed in step 103, a querying process is described in the embodiment shown in FIG. 1A. A flow table of a global terminal device level is first queried; after a terminal device to which the data packet belongs is identified, a service-level flow corresponding to the terminal device is queried, to identify a service flow to which the data packet belongs, and obtain the corresponding flow rule.

Step 105: Optionally, after completing data processing, the base station deletes the corresponding flow rule of the terminal device or the data stream in the flow table.

The base station may delete the corresponding flow rule of the terminal device or the data stream in the flow table or remove all flow rules from the flow table. Alternatively, after an interval of several scheduling cycles or transmission time periods, the base station deletes the corresponding flow rule of the terminal device or the data stream in the flow table or removes all flow rules from the flow table.

The foregoing embodiment describes a design proposed when a scheduler and a flow table are located in a wireless access device, for example, a physical entity such as a base station. In some designs implemented by means of separation, a scheduler may not be located in a base station, but located in a wireless access device controller, such as a base station controller, and is in a physical entity different from that of a flow table.

Figure 2A:
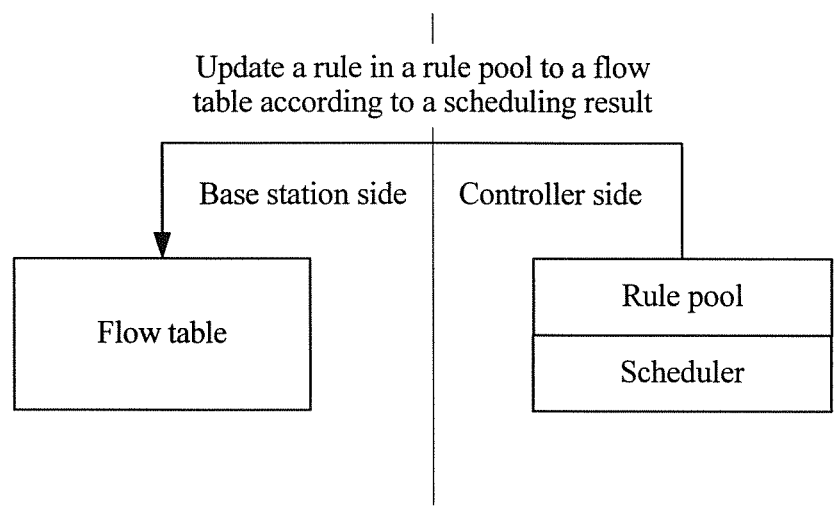
FIG. 2A is a schematic diagram of a system for processing an adaptive flow table according to another embodiment of this application.
Figure 2B:
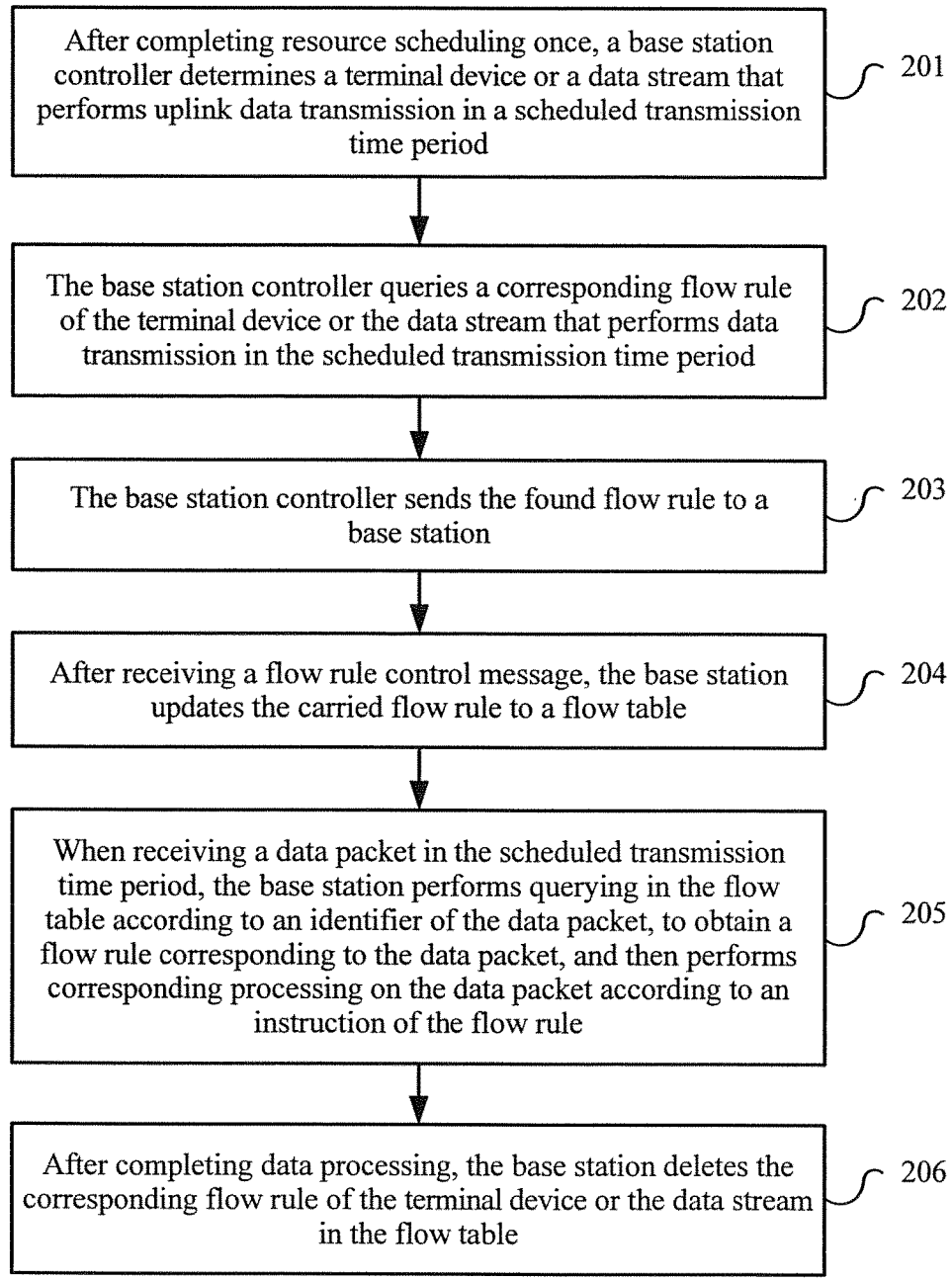
FIG. 2B is a flowchart of a method for processing an adaptive flow table according to another embodiment of this application.

In a specific embodiment, as shown in FIG. 2A, when a scheduler and a rule pool are located in a base station controller and a flow table is located in a base station, referring to FIG. 2B, a method for processing an adaptive flow table includes the following steps.

Step 201: After completing resource scheduling once, a base station controller determines a terminal device or a data stream that performs uplink data transmission in a scheduled time period.

After a scheduler on the base station controller completes resource scheduling once, a terminal device or a data stream that transmits data to a base station in a scheduled transmission time period may be determined. There may be one or more terminal devices or data streams. The base station controller may learn an identifier of the terminal device or the data stream, such as a terminal device identifier of the terminal device or a connection identifier of the data stream.

Step 202: The base station controller queries a corresponding flow rule of the terminal device or the data stream that performs uplink data transmission in the scheduled time period.

After determining the terminal device or the data stream that transmits data to the base station in the scheduled transmission time period, the base station controller queries, from the rule pool, a corresponding flow rule of the terminal device or the data stream according to the identifier of the terminal device or the data stream. For example, the base station controller may perform querying in the rule pool according to the terminal device identifier of the terminal device or the connection identifier of the data stream, to obtain a corresponding flow rule that is of the terminal device or the data stream and that may be used in the scheduled transmission time period. For a manner of table lookup, refer to the embodiment shown in FIG. 1A.

Step 203: The base station controller sends the found flow rule to a base station.

The base station controller may send a flow rule control message to the base station. The flow rule control message includes the found corresponding flow rule of the terminal device or the data stream, and may further include the identifier of the terminal device or the data stream, such as the terminal device identifier of the terminal device or the connection identifier of the data stream.

Step 204: After receiving a flow rule control message, the base station updates the carried flow rule to a flow table.

In this step, the base station may write the found flow rule into the flow table before the scheduled transmission time period. The found flow rule may include the identifier of the terminal device or the data stream and the corresponding flow rule. Further, a flow rule existed in the flow table may be deleted so as to avoid excessively long table lookup time caused by an excessively large flow table after a data packet is received. The flow table may be in multiple forms, such as a first-level flow table or a second-level flow table mentioned in the embodiment shown in FIG. 1D.

Step 205: When receiving a data packet in the scheduled time period, the base station performs querying in the flow table according to an identifier of the data packet, for example, performs querying according to a terminal device identifier or a connection identifier of the data packet, to obtain a flow rule corresponding to the data packet, and then performs corresponding processing on the data packet according to an instruction of the flow rule. For a manner of table lookup, refer to the embodiment shown in FIG. 1D.

Step 206: Optionally, after completing data processing, the base station deletes the corresponding flow rule of the terminal device or the data stream in the flow table.

The base station may delete the corresponding flow rule of the terminal device or the data stream in the flow table or remove all flow rules from the flow table. Alternatively, after an interval of several scheduling cycles or transmission time periods, the base station deletes the corresponding flow rule of the terminal device or the data stream in the flow table or removes all flow rules from the flow table. Alternatively, the base station controller delivers a flow rule deletion instruction to instruct to delete one or more flow rules, and when receiving the instruction, the base station deletes the corresponding flow rule of the terminal device or the data stream.

Figure 3A:
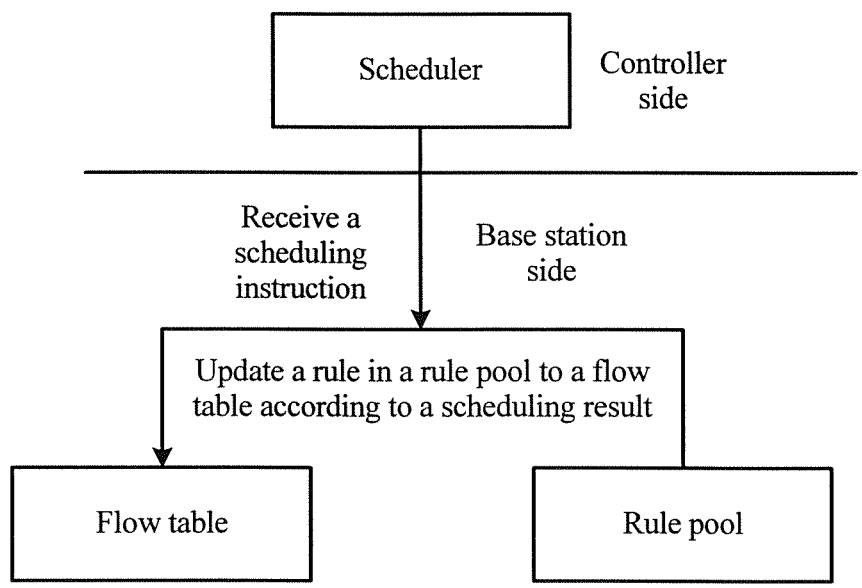
FIG. 3A is a schematic diagram of a system for processing an adaptive flow table according to still another embodiment of this application.
Figure 3B:
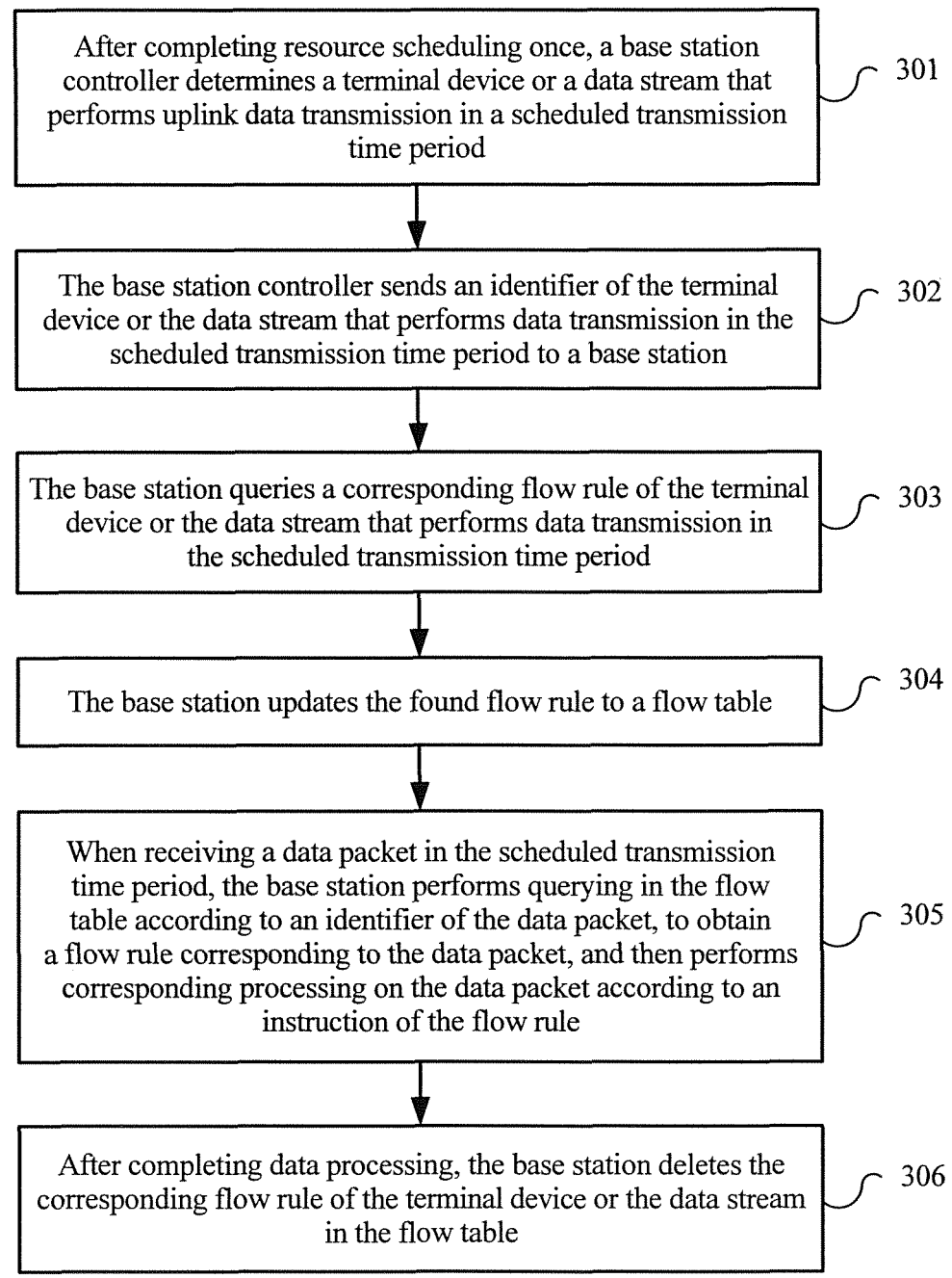
FIG. 3B is a flowchart of a method for processing an adaptive flow table according to still another embodiment of this application.

In another specific embodiment, referring to FIG. 3A, when a scheduler is located in a base station controller and a flow table and a rule pool are located in a base station, referring to FIG. 3B, a method for processing an adaptive flow table includes the following steps.

Step 301: After completing resource scheduling once, a base station controller determines a terminal device or a data stream that performs uplink data transmission in a scheduled time period.

After a scheduler on the base station controller completes resource scheduling once, a terminal device or a data stream that transmits data to a base station in a scheduled transmission time period may be determined. There may be one or more terminal devices or data streams. The base station controller may learn an identifier of the terminal device or the data stream, such as a terminal device identifier of the terminal device or a connection identifier of the data stream.

Step 302: The base station controller sends an identifier of the terminal device or the data stream that performs uplink data transmission in the scheduled transmission time period to a base station.

The base station controller may send the terminal device identifier or the connection identifier of the data stream to the base station by using a control message. For example, the base station controller sends the terminal device identifier or the connection identifier of the data stream to the base station by using a scheduling grant message.

Step 303: The base station queries a corresponding flow rule of the terminal device or the data stream that performs data transmission in the scheduled transmission time period.

After determining the terminal device or the data stream that transmits data to the base station in the scheduled transmission time period, the base station queries, from the rule pool, a corresponding flow rule of the terminal device or the data stream according to the identifier of the terminal device or the data stream. For example, the base station may perform querying in the rule pool according to the terminal device identifier of the terminal device or the connection identifier of the data stream, to obtain a corresponding flow rule that is of the terminal device or the data stream and that may be used in the scheduled transmission time period. For a manner of table lookup, refer to the embodiment shown in FIG. 1A.

Step 304: The base station updates the found flow rule to a flow table.

In this step, the base station may write the found flow rule into the flow table before the scheduled transmission time period. The found flow rule may include the identifier of the terminal device or the data stream and the corresponding flow rule. Further, a flow rule existed in the flow table may be deleted so as to avoid excessively long table lookup time caused by an excessively large flow table after a data packet is received. The flow table may be in multiple forms, such as a first-level flow table or a second-level flow table mentioned in the embodiment shown in FIG. 1D.

Step 305: When receiving a data packet in the scheduled time period, the base station performs querying in the flow table according to an identifier of the data packet, for example, performs querying according to a terminal device identifier or a connection identifier of the data packet, to obtain a flow rule corresponding to the data packet, and then performs corresponding processing on the data packet according to an instruction of the flow rule. For a manner of table lookup, refer to the embodiment shown in FIG. 1D.

Step 306: Optionally, after completing data processing, the base station deletes the corresponding flow rule of the terminal device or the data stream in the flow table.

The base station may delete the corresponding flow rule of the terminal device or the data stream in the flow table or remove all flow rules from the flow table. Alternatively, after an interval of several scheduling cycles or transmission time periods, the base station deletes the corresponding flow rule of the terminal device or the data stream in the flow table or removes all flow rules from the flow table.

Figure 4:
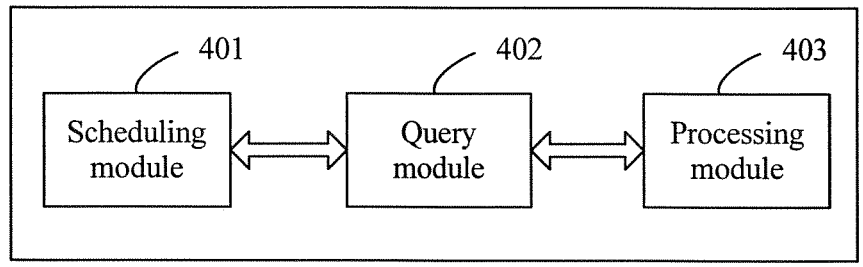
FIG. 4 is a schematic structural diagram of an apparatus for processing an adaptive flow table according to an embodiment of this application.

Based on the foregoing method embodiment shown in FIG. 1D, the present invention further provides an apparatus for processing an adaptive flow table. Referring to FIG. 4, the apparatus includes:

a scheduling module 401, configured to perform resource scheduling to determine a terminal device or a data stream that performs uplink data transmission in a scheduled time period;

a query module 402, configured to query a corresponding flow rule of the terminal device or the data stream, and update the found flow rule to a flow table; and when a processing module receives a data packet in the scheduled time period, query, from the flow table, a flow rule corresponding to the data packet; and the processing module 403, configured to receive the data packet in the scheduled time period, and perform corresponding processing on the data packet according to the flow rule corresponding to the data packet.

Further, the query module 402 is specifically configured to query, from a rule pool, the corresponding flow rule of the terminal device or the data stream according to a terminal device identifier of the terminal device or a connection identifier of the data stream.

Further, the query module 402 is specifically configured to query, from the flow table according to a terminal device identifier or a connection identifier of the data packet, the flow rule corresponding to the data packet.

The apparatus further includes a deletion module, configured to delete the corresponding flow rule in the flow table after data processing is completed; or delete the corresponding flow rule in the flow table after several scheduling cycles.

The apparatus may be a wireless access device, such as a base station in the embodiment shown in FIG. 1D. Corresponding functional modules of the apparatus respectively perform corresponding steps in the method embodiment.

Based on the foregoing embodiment, another embodiment of the present invention further provides an apparatus for processing an adaptive flow table. The apparatus includes a scheduler and a processor. The scheduler is configured to perform a corresponding step of the scheduling module 401, and the processor is configured to perform corresponding steps of the query module 402, the processing module 403, and the deletion module. In addition, the apparatus may further include a memory, configured to store a flow table.

Figure 5:
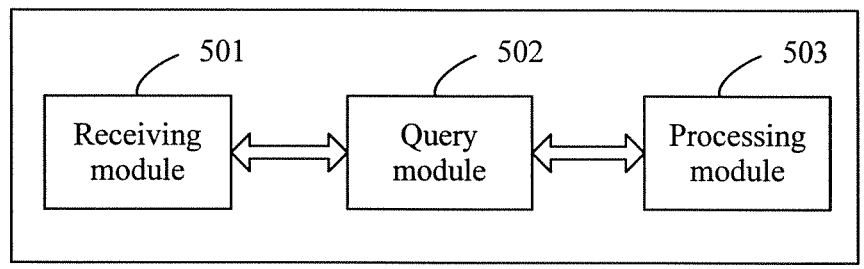
FIG. 5 is a schematic structural diagram of an apparatus for processing an adaptive flow table according to another embodiment of this application.

Based on the foregoing method embodiment shown in FIG. 2B, an embodiment of the present invention further provides an apparatus for processing an adaptive flow table. Referring to FIG. 5, the apparatus includes:

a receiving module 501, configured to receive a flow rule sent by a wireless access device controller, where the flow rule is a corresponding flow rule that is found after the wireless access device controller performs resource scheduling to determine a terminal device or a data stream that performs uplink data transmission in a scheduled time period, and that is of the terminal device or the data stream;

a query module 502, configured to update the flow rule to a flow table; and when a processing module 530 receives a data packet in the scheduled time period, query, from the flow table, a flow rule corresponding to the data packet; and the processing module 503, configured to receive the data packet in the scheduled time period, and perform corresponding processing on the data packet according to the flow rule corresponding to the data packet.

Further, the receiving module 501 is specifically configured to receive, by using a flow rule control message, the flow rule sent by the wireless access device controller.

Further, the apparatus further includes a deletion module, configured to delete the corresponding flow rule in the flow table after data processing is completed; or delete the corresponding flow rule in the flow table after several scheduling cycles; or delete the corresponding flow rule in the flow table according to a flow rule deletion instruction delivered by the wireless access device controller.

The apparatus may be a wireless access device, such as a base station in the embodiment shown in FIG. 2B. Corresponding functional modules of the apparatus respectively perform corresponding steps in the method embodiment.

Based on the foregoing embodiment, another embodiment of the present invention further provides an apparatus for processing an adaptive flow table. The apparatus includes a receiver and a processor. The receiver is configured to perform a corresponding step of the receiving module 501, and the processor is configured to perform corresponding steps of the query module 502, the processing module 503, and the deletion module. In addition, the apparatus may further include a memory, configured to store a flow table.

Figure 6:
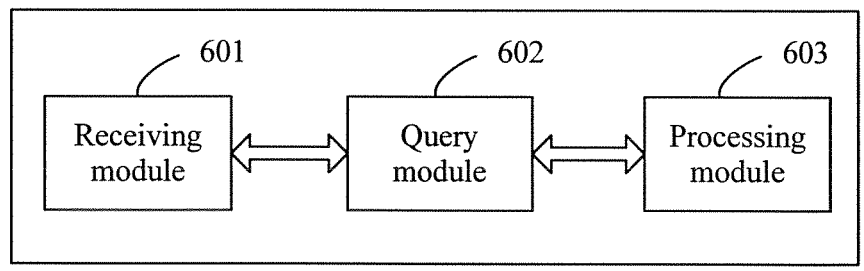
FIG. 6 is a schematic structural diagram of an apparatus for processing an adaptive flow table according to still another embodiment of this application.

Based on the foregoing method embodiment shown in FIG. 3B, an embodiment of the present invention further provides an apparatus for processing an adaptive flow table. Referring to FIG. 6, the apparatus includes:

a receiving module 601, configured to receive an identifier that is of a terminal device or a data stream and that is sent by a wireless access device controller, where the identifier of the terminal device or the data stream is an identifier of a terminal device or a data stream that performs uplink data transmission in a scheduled time period and that is determined by the wireless access device controller by performing resource scheduling;

a query module 602, configured to query a corresponding flow rule of the terminal device or the data stream according to the identifier of the terminal device or the data stream, and update the found flow rule to a flow table; and when a processing module 603 receives a data packet in the scheduled time period, query, from the flow table, a flow rule corresponding to the data packet; and the processing module 603, configured to receive the data packet in the scheduled time period, and perform corresponding processing on the data packet according to the flow rule corresponding to the data packet.

The receiving module 601 is specifically configured to receive, by using a scheduling grant message, the identifier that is of the terminal device or the data stream and that is sent by the wireless access device controller.

Further, the apparatus further includes a deletion module, configured to delete the corresponding flow rule in the flow table after data processing is completed; or delete the corresponding flow rule in the flow table after several scheduling cycles.

The apparatus may be a wireless access device, such as a base station in the embodiment shown in FIG. 3B. Corresponding functional modules of the apparatus respectively perform corresponding steps in the method embodiment.

Based on the foregoing embodiment, another embodiment of the present invention further provides an apparatus for processing an adaptive flow table. The apparatus includes a receiver and a processor. The receiver is configured to perform a corresponding step of the receiving module 601, and the processor is configured to perform corresponding steps of the query module 602, the processing module 603, and the deletion module. In addition, the apparatus may further include a memory, configured to store a flow table.

Figure 7:
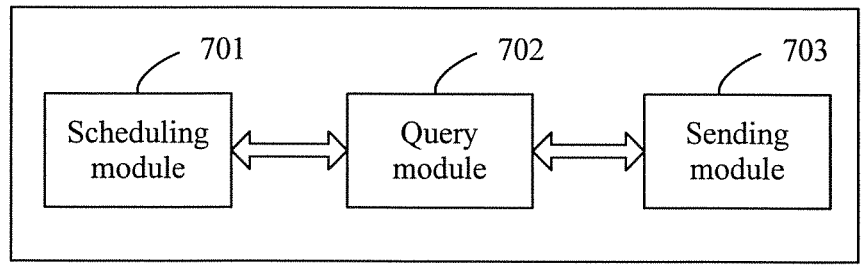
FIG. 7 is a schematic structural diagram of an apparatus for processing an adaptive flow table according to yet another embodiment of this application.

Based on the foregoing method embodiment shown in FIG. 2B, an embodiment of the present invention further provides an apparatus for processing an adaptive flow table. Referring to FIG. 7, the apparatus includes:

a scheduling module 701, configured to perform resource scheduling to determine a terminal device or a data stream that performs uplink data transmission in a scheduled time period;

a query module 702, configured to query a corresponding flow rule of the terminal device or the data stream; and a sending module 703, configured to send the found flow rule to a wireless access device, so that the wireless access device updates the flow rule to a flow table, and when receiving a data packet in the scheduled time period, the wireless access device queries, from the flow table, a flow rule corresponding to the data packet, and performs corresponding processing on the data packet according to the flow rule corresponding to the data packet.

The apparatus may be a wireless access device controller, such as a base station controller in the embodiment shown in FIG. 2B. Corresponding functional modules of the apparatus respectively perform corresponding steps in the method embodiment.

Based on the foregoing embodiment, another embodiment of the present invention further provides an apparatus for processing an adaptive flow table. The apparatus includes a scheduler, a processor, and a transmitter. The scheduler is configured to perform a corresponding step of the scheduling module 701, the processor is configured to perform corresponding steps of the query module 702 and the deletion module, and the transmitter is configured to perform a corresponding step of the sending module 703.

In the foregoing embodiments of the present invention, before data arrives at a wireless access device, a terminal device or a data stream that is to perform uplink data transmission is determined in advance by using a scheduling process, so that a flow rule that may be used by the terminal device or the data stream is queried in advance and updated to a flow table. When a data packet arrives at the wireless access device, a corresponding flow rule of the data packet is queried directly according to the flow table. Because the flow table is relatively small, a delay of data in a flow table matching process is reduced. In addition, further, the flow rule in the flow table is deleted after data processing is completed. Therefore, excessively long table lookup time caused by an excessively large flow table is avoided, so that the delay is reduced.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

In the end, it should be further noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

For ease of description, the foregoing apparatus is described by dividing the functions into various units. Certainly, when this application is implemented, the functions of each unit may be implemented in one or more pieces of software and/or hardware.

It may be learned from description of the foregoing implementation manners that, a person skilled in the art may clearly understand that this application may be implemented by using software in addition to a necessary universal hardware platform. Based on such an understanding, the technical solutions of this application essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or in some parts of the embodiments of this application.

The embodiments disclosed above are described to enable a person skilled in the art to implement or use this application. Various modifications made to the embodiments will be obvious to a person skilled in the art, and the general principles defined herein may also be implemented in other embodiments without departing from the scope of this application. Therefore, this application is not intended to be limited to these embodiments illustrated herein, but shall be construed in the widest scope consistent with the principles and novel features disclosed herein.

What is claimed is:

1. A method for processing an adaptive flow table, comprising:
    performing, by a wireless access device, resource scheduling to determine a terminal device or a data stream that performs uplink data transmission in a scheduled time period;
    querying, by the wireless access device, a corresponding flow rule of the terminal device or the data stream, and updating the found flow rule to a flow table;
    when receiving a data packet in the scheduled time period, querying, by the wireless access device and from the flow table, a flow rule corresponding to the data packet, and performing corresponding processing on the data packet according to the flow rule corresponding to the data packet; and
    wherein querying, by the wireless access device and from the flow table, the flow rule corresponding to the data packet comprises:
        querying, by the wireless access device, from the flow table, and according to a terminal device identifier or a connection identifier of the data packet, the flow rule corresponding to the data packet.

2. The method according to claim 1, wherein querying, by the wireless access device, the corresponding flow rule of the terminal device or the data stream that performs data transmission in the scheduled time period comprises:
    querying, by the wireless access device and from a rule pool, the corresponding flow rule of the terminal device or the data stream according to a terminal device identifier of the terminal device or a connection identifier of the data stream.

3. The method according to claim 1, wherein the method further comprises at least one of:
    deleting the corresponding flow rule in the flow table after data processing is completed; and
    deleting the corresponding flow rule in the flow table after several scheduling cycles.

4. A method for processing an adaptive flow table, comprising:
    receiving, by a wireless access device, a flow rule sent by a wireless access device controller, wherein the flow rule is a corresponding flow rule that is found after the wireless access device controller performs resource scheduling to determine a terminal device or a data stream that performs uplink data transmission in a scheduled time period, and that is of the terminal device or the data stream;
    updating, by the wireless access device, the flow rule to a flow table;
    when receiving a data packet in the scheduled time period, querying, by the wireless access device and from the flow table, a flow rule corresponding to the data packet, and performing corresponding processing on the data packet according to the flow rule corresponding to the data packet; and
    wherein querying, by the wireless access device and from the flow table, the flow rule corresponding to the data packet comprises:
        querying, by the wireless access device, from the flow table, and according to a terminal device identifier or a connection identifier of the data packet, the flow rule corresponding to the data packet.

5. The method according to claim 4, wherein the wireless access device receives, by using a flow rule control message, the flow rule sent by the wireless access device controller.

6. The method according to claim 4, wherein the method further comprises at least one of:
  deleting the corresponding flow rule in the flow table after data processing is completed;
  deleting the corresponding flow rule in the flow table after several scheduling cycles; and
  deleting the corresponding flow rule in the flow table according to a deletion instruction delivered by the wireless access device controller.

7. A method for processing an adaptive flow table, comprising:
  receiving, by a wireless access device, an identifier that is of a terminal device or a data stream and that is sent by a wireless access device controller, wherein the identifier of the terminal device or the data stream is an identifier of a terminal device or a data stream that performs uplink data transmission in a scheduled time period and that is determined by the wireless access device controller by performing resource scheduling;
  querying, by the wireless access device, a corresponding flow rule of the terminal device or the data stream according to the identifier of the terminal device or the data stream, and updating the found flow rule to a flow table;
  when receiving a data packet in the scheduled time period, querying, by the wireless access device and from the flow table, a flow rule corresponding to the data packet, and performing corresponding processing on the data packet according to the flow rule corresponding to the data packet; and
  wherein querying, by the wireless access device and from the flow table, the flow rule corresponding to the data packet comprises:
    querying, by the wireless access device, from the flow table, and according to a terminal device identifier or a connection identifier of the data packet, the flow rule corresponding to the data packet.

8. The method according to claim 7, wherein the wireless access device receives, by using a scheduling grant message, the identifier that is of the terminal device or the data stream and that is sent by the wireless access device controller.

9. A method for processing an adaptive flow table, comprising:
  after performing resource scheduling to determine a terminal device or a data stream that performs uplink data transmission in a scheduled time period, querying, by a wireless access device controller, a corresponding flow rule of the terminal device or the data stream;
  sending, by the wireless access device controller, the found flow rule to a wireless access device, so that the wireless access device updates the flow rule to a flow table, and when receiving a data packet in the scheduled time period, the wireless access device queries, from the flow table, a flow rule corresponding to the data packet, and performs corresponding processing on the data packet according to the flow rule corresponding to the data packet; and
  wherein querying, by the wireless access device and from the flow table, the flow rule corresponding to the data packet comprises:
    querying, by the wireless access device, from the flow table, and according to a terminal device identifier or a connection identifier of the data packet, the flow rule corresponding to the data packet.

10. An apparatus for processing an adaptive flow table, comprising:
  a scheduler, configured to perform resource scheduling to determine a terminal device or a data stream that performs uplink data transmission in a scheduled time period; and
  a processor, configured to:
    query a corresponding flow rule of the terminal device or the data stream,
    update the found flow rule to a flow table, and when the processor receives a data packet in the scheduled time period, query, from the flow table, a flow rule corresponding to the data packet,
    receive the data packet in the scheduled time period, and perform corresponding processing on the data packet according to the flow rule corresponding to the data packet; and
    query, from the flow table according to a terminal device identifier or a connection identifier of the data packet, the flow rule corresponding to the data packet.

11. The apparatus according to claim 10, wherein the scheduler is configured to:
  query, from a rule pool, the corresponding flow rule of the terminal device or the data stream according to a terminal device identifier of the terminal device or a connection identifier of the data stream.

12. The apparatus according to claim 10, wherein the processor is further configured to do at least one of:
  delete the corresponding flow rule in the flow table after data processing is completed; and
  delete the corresponding flow rule in the flow table after several scheduling cycles.

13. An apparatus for processing an adaptive flow table, comprising:
  a receiver, configured to receive a flow rule sent by a wireless access device controller, wherein the flow rule is a corresponding flow rule that is found after the wireless access device controller performs resource scheduling to determine a terminal device or a data stream that performs uplink data transmission in a scheduled time period, and that is of the terminal device or the data stream; and
  a processor, configured to:
    update the flow rule to a flow table, and when the processor receives a data packet in the scheduled time period, query, from the flow table, a flow rule corresponding to the data packet,
    receive the data packet in the scheduled time period, and perform corresponding processing on the data packet according to the flow rule corresponding to the data packet; and
    query, from the flow table according to a terminal device identifier or a connection identifier of the data packet, the flow rule corresponding to the data packet.

14. The apparatus according to claim 13, wherein the receiver is configured to receive, by using a flow rule control message, the flow rule sent by the wireless access device controller.

15. The apparatus according to claim 13, wherein the processor is further configured to do at least one of:
  delete the corresponding flow rule in the flow table after data processing is completed;
  delete the corresponding flow rule in the flow table after several scheduling cycles; and
  delete the corresponding flow rule in the flow table according to a deletion instruction sent by the wireless access device controller.

16. An apparatus for processing an adaptive flow table, comprising:
  a receiver, configured to receive an identifier that is of a terminal device or a data stream and that is sent by a wireless access device controller, wherein the identifier of the terminal device or the data stream is an identifier of a terminal device or a data stream that performs uplink data transmission in a scheduled time period and that is determined by the wireless access device controller by performing resource scheduling; and
  a processor, configured to:
    query a corresponding flow rule of the terminal device or the data stream according to the identifier of the terminal device or the data stream,
    update the found flow rule to a flow table,
    when the processor receives a data packet in the scheduled time period, query, from the flow table, a flow rule corresponding to the data packet, and
    receive the data packet in the scheduled time period, and perform corresponding processing on the data packet according to the flow rule corresponding to the data packet; and
    query, from the flow table according to a terminal device identifier or a connection identifier of the data packet, the flow rule corresponding to the data packet.

17. The apparatus according to claim 16, wherein the receiver is configured to receive, by using a scheduling grant message, the identifier that is of the terminal device or the data stream and that is sent by the wireless access device controller.

18. An apparatus for processing an adaptive flow table, comprising:
  a scheduler, configured to perform resource scheduling to determine a terminal device or a data stream that performs uplink data transmission in a scheduled time period;
  a processor, configured to query a corresponding flow rule of the terminal device or the data stream;
  a transmitter, configured to send the found flow rule to a wireless access device, so that the wireless access device updates the flow rule to a flow table, and when receiving a data packet in the scheduled time period, the wireless access device queries, from the flow table, a flow rule corresponding to the data packet, and performs corresponding processing on the data packet according to the flow rule corresponding to the data packet; and
  wherein the processor is further configured to query, from the flow table according to a terminal device identifier or a connection identifier of the data packet, the flow rule corresponding to the data packet.

* * * * *